US008594708B2

(12) United States Patent
Nakaji

(10) Patent No.: US 8,594,708 B2
(45) Date of Patent: Nov. 26, 2013

(54) PORTABLE TELEPHONE INFORMATION VISUALIZING DEVICE FOR VISUALIZING INFORMATION RELATING TO PORTABLE TELEPHONE TERMINALS

(75) Inventor: Kazuhide Nakaji, Tokyo (JP)

(73) Assignee: NEC Corporation, Tokyo (JP)

( * ) Notice: Subject to any disclaimer, the term of this patent is extended or adjusted under 35 U.S.C. 154(b) by 240 days.

(21) Appl. No.: 12/935,030

(22) PCT Filed: Mar. 31, 2009

(86) PCT No.: PCT/JP2009/056587
§ 371 (c)(1),
(2), (4) Date: Sep. 28, 2010

(87) PCT Pub. No.: WO2009/128341
PCT Pub. Date: Oct. 22, 2009

(65) Prior Publication Data
US 2011/0021214 A1 Jan. 27, 2011

(30) Foreign Application Priority Data
Apr. 16, 2008 (JP) ................................. 2008-106279

(51) Int. Cl.
*H04W 24/00* (2009.01)
(52) U.S. Cl.
USPC ........ 455/457; 455/404.2; 455/415; 455/418; 455/518; 455/519; 455/520; 455/521; 455/522
(58) Field of Classification Search
USPC ........ 455/404.2, 415, 418–420, 456.1–456.3, 455/456.5, 456.6, 457, 518–522
See application file for complete search history.

(56) References Cited

U.S. PATENT DOCUMENTS

| 6,415,132 | B1 * | 7/2002 | Sabat, Jr. ...................... 455/3.01 |
| 2006/0199612 | A1 * | 9/2006 | Beyer et al. ................ 455/556.2 |
| 2008/0059259 | A1 | 3/2008 | Kitayama et al. |

FOREIGN PATENT DOCUMENTS

| CN | 1816082 A | 8/2006 |
| JP | 10-255081 A | 9/1998 |
| JP | 2001188014 A | 7/2001 |
| JP | 2002009949 A | 1/2002 |
| JP | 2002024471 A | 1/2002 |
| JP | 2002077971 A | 3/2002 |
| JP | 2002259581 A | 9/2002 |
| JP | 2002297647 A | 10/2002 |
| JP | 2002342557 A | 11/2002 |
| JP | 2003122877 A | 4/2003 |

(Continued)

OTHER PUBLICATIONS

Japanese Office Action for JP2008-106279 Issued Apr. 24, 2012.
International Search Report for PCT/JP2009/056587 mailed Jun. 16, 2009.
Japanese Office Action for JP2008-106279 mailed on Jul. 17, 2012.
Chinese Office Action for CN Application No. 200980113205.8 issued on Jan. 23, 2013 with English Translation.

*Primary Examiner* — Joseph Arevalo

(57) ABSTRACT

A portable telephone information visualizing device (server device 1) includes: grouping means (portable telephone terminal grouping unit 11) that, based on at least one item of information from among space, time, speed, information associated with the individual identification number of the portable telephone terminals, and status information indicating the state of the portable telephone terminals, performs grouping of information of each portable telephone terminal belonging to a common carrier of portable telephone terminals (4-1-4-*n*), and means (portable telephone terminal display data creation unit 12) that creates display data for visualizing the number of constituents of a group that has undergone this grouping, the movement of this group, and the relation between this group and a group other than this group.

12 Claims, 16 Drawing Sheets

(56) References Cited

FOREIGN PATENT DOCUMENTS

| | | |
|---|---|---|
| JP | 2003223449 A | 8/2003 |
| JP | 2003228797 A | 8/2003 |
| JP | 2005018375 A | 1/2005 |
| JP | 2005293242 A | 10/2005 |
| JP | 2006260331 A | 9/2006 |
| JP | 2006262189 A | 9/2006 |
| JP | 2007265115 A | 10/2007 |
| JP | 2007304009 A | 11/2007 |
| JP | 2008059364 A | 3/2008 |

* cited by examiner

PORTABLE TELEPHONE INFORMATION VISUALIZING DEVICE FOR VISUALIZING INFORMATION RELATING TO PORTABLE TELEPHONE TERMINALS

This application is the National Phase of PCT/JP2009/056587, filed Mar. 31, 2009, which claims priority based on JP-A-2008-106279, for which application was submitted on Apr. 16, 2008, and incorporates all disclosures of that application.

TECHNICAL FIELD

The present invention relates to a portable telephone information visualizing device for visualizing information relating to portable telephone terminals, a portable telephone information visualizing system, and a portable telephone information visualizing method for use in the device and system.

BACKGROUND ART

The personal information of a user of a portable telephone includes information such as the subscriber's name, age, gender, the state of use of the portable telephone or of mail operation, and the user's position information. The use of this personal information is limited to cases such as when police or firefighters respond to a problem such as an emergency, when a parent checks the position of his child by means of a portable telephone that incorporates GPS (Global Positioning System) for ensuring safety of the child, or when the owner of a portable telephone checks his own current position.

The problem therefore arises that cases in which the personal information of the users of portable telephones can be used are limited to the above-described cases and ordinary people are unable to use the above-described personal information of the users of portable telephones.

As an example of a technique that uses position information of portable telephones, JP-A-2003-122877 discloses a technique for estimating the population of a specific area. In this technique, population is estimated by finding the number of responses of portable telephones geometrically based on, for example, the strength of received radio waves with base stations and then dividing by the diffusion rate of the portable telephones.

However, this is technology of a time when GPS did not exist, and the number of responses is therefore lacking in accuracy. This technology is further limited to simply estimating population and is unable to provide a service in which ordinary people can use various personal information such as the state of operation of a portable telephone, GPS position information, or information provided when making a contract that would be available for use by police or firefighters.

DISCLOSURE OF THE INVENTION

It is an object of the present invention to provide a portable telephone information visualizing device, a portable telephone information visualizing system, and a portable telephone information visualizing method for use in the device and system that solves the above-described problems and that allows ordinary people to use personal information of the user of a portable telephone.

The portable telephone information visualizing device according to the present invention for realizing the above-described object includes:

means for performing grouping of information of each of portable telephone terminals belonging to a common carrier based on at least one item of information from among space, time, speed, information associated with the individual identification numbers of portable telephone terminals, and status information indicating the state of the portable telephone terminals; and means for creating display data for visualizing the number of constituents of a group that has undergone grouping, movements of that group, and relations between that group and a group other than that group.

The portable telephone information visualizing system according to the present invention includes:

the above-described portable telephone information visualizing device;

portable telephone terminals; and a terminal that displays the display data that is created by the portable telephone information visualizing device.

In addition, the portable telephone information visualizing method of the present invention is a portable telephone information visualizing method that is carried out by the portable telephone information visualizing device and includes processes of:

grouping information of each of portable telephone terminals belonging to common carriers based on at least one items of information from among space, time, speed, information associated with the individual identification numbers of the portable telephone terminals, and status information indicating the state of the portable telephone terminals; and creating display data for visualizing the number of constituents of a group that has undergone grouping, the movement of that group, and the relation between that group and a group other than that group.

The present invention, by the above-described configuration and operations, allows ordinary persons to use the personal information of the users of portable telephones.

BEST MODE FOR CARRYING OUT THE INVENTION

Exemplary embodiments of the present invention are next described with reference to the accompanying figures. First, an outline of the present invention is described. The present invention is a means for grouping portable telephone terminals based on information that is designated from among, for example, space, time, speed, information (address, names, ages, etc.) that is associated with individual identification numbers of portable telephone terminals, and further, status information indicating the state (power ON or power OFF, engaged in conversation or not) of portable telephone terminals; and for visualizing and displaying the number of constituents of groups that have undergone grouping, the movement of these groups, or the relation between these groups.

In this case, based on a designated location, designated time, or designated speed, the present invention enables the analysis and display of the state of congestion of roads, the number of attendees of an event, the crowded state of a train station, the reconstruction of a past state, or the relation between designated groups. As a result, the personal information of the users of portable telephone terminals can be used by an ordinary person. The present invention can be applied to a wide range of fields that use the above-described analysis results such as transportation, travel, retailing, product planning, and crisis management.

First Exemplary Embodiment

Figure 1:
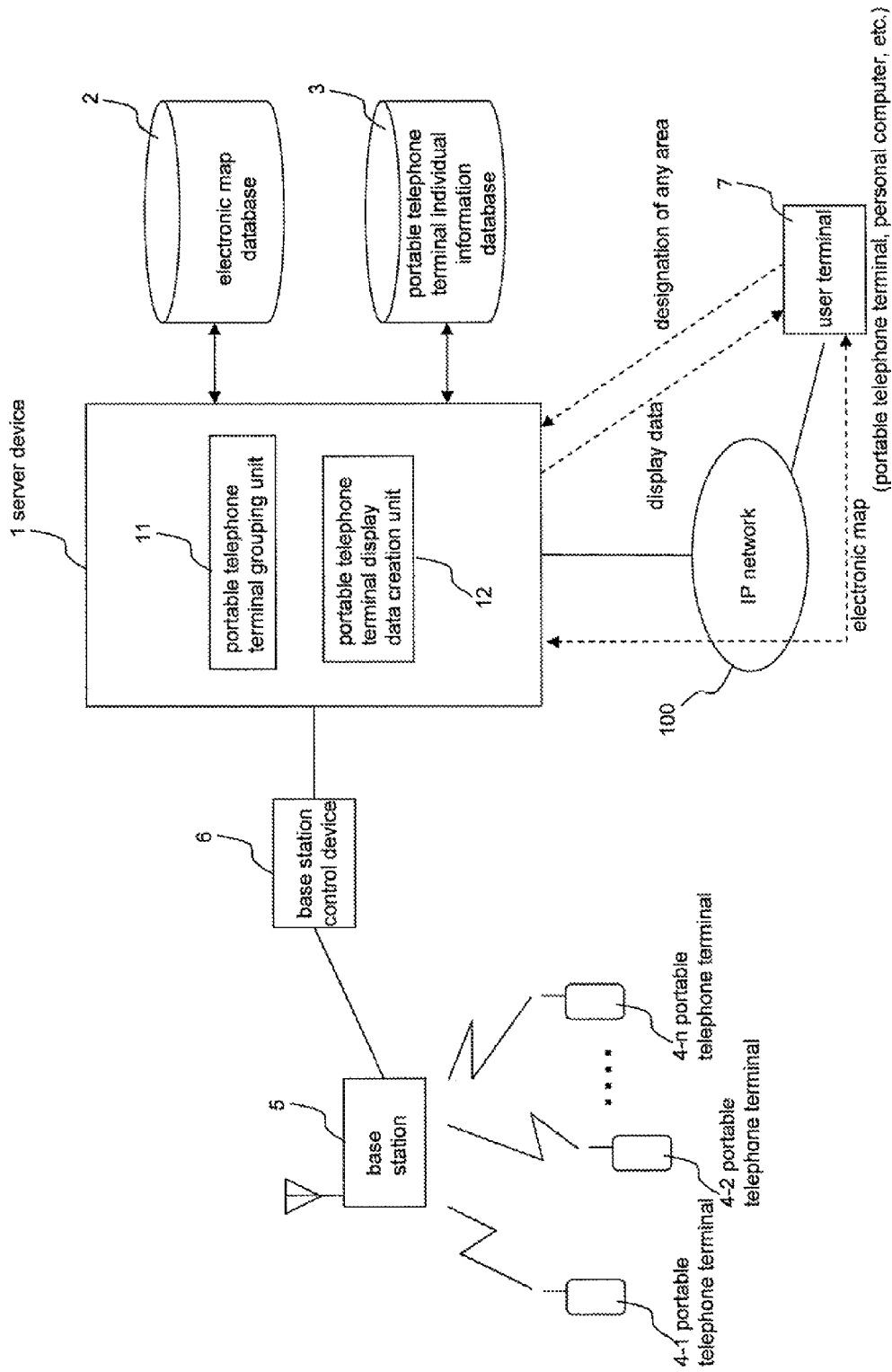
FIG. 1 is a block diagram showing an example of the configuration of a portable telephone information visualizing system according to the first exemplary embodiment of the present invention.

FIG. 1 is a block diagram showing an example of the configuration of the portable telephone information visualizing system according to the first exemplary embodiment of the present invention.

As shown in FIG. 1, the portable telephone information visualizing system according to the present exemplary embodiment is provided with: server device 1 that is a portable telephone terminal information visualizing device, electronic map database 2, portable telephone terminal individual information database 3, portable telephone terminals 4-1-4-n (where n is a positive integer), base station 5, base station control device 6, and user terminal 7 that is a terminal such as a portable telephone terminal or personal computer. In addition, server device 3 and user terminal 7 are connected by IP (Internet Protocol) network 100.

Server device 1 is a server device of a common carrier and is provided with: portable telephone terminal grouping unit 11 that performs grouping of various items of information of portable telephone terminals 4-1-4-n based on designated conditions; and portable telephone terminal display data creation unit 12 that creates display data for user terminal 7 based on information that has undergone grouping by portable telephone terminal grouping unit 11. Server device 1 further forms a mobile communication network together with base station 5 and base station control device 6.

Electronic map database 2 accumulates electronic map data for input of designated conditions by user terminal 7 when grouping various items of information of portable telephone terminals 4-1-4-n.

Portable telephone terminal individual information database 3 accumulates various items of information of portable telephone terminals 4-1-4-n, such as the space, time, speed, information associated with the individual identification numbers of the portable telephone terminals (address, name, age, etc.), and further, status information indicating the state of the portable telephone terminals (power ON, power OFF, engaged in conversation or not).

Figure 2:
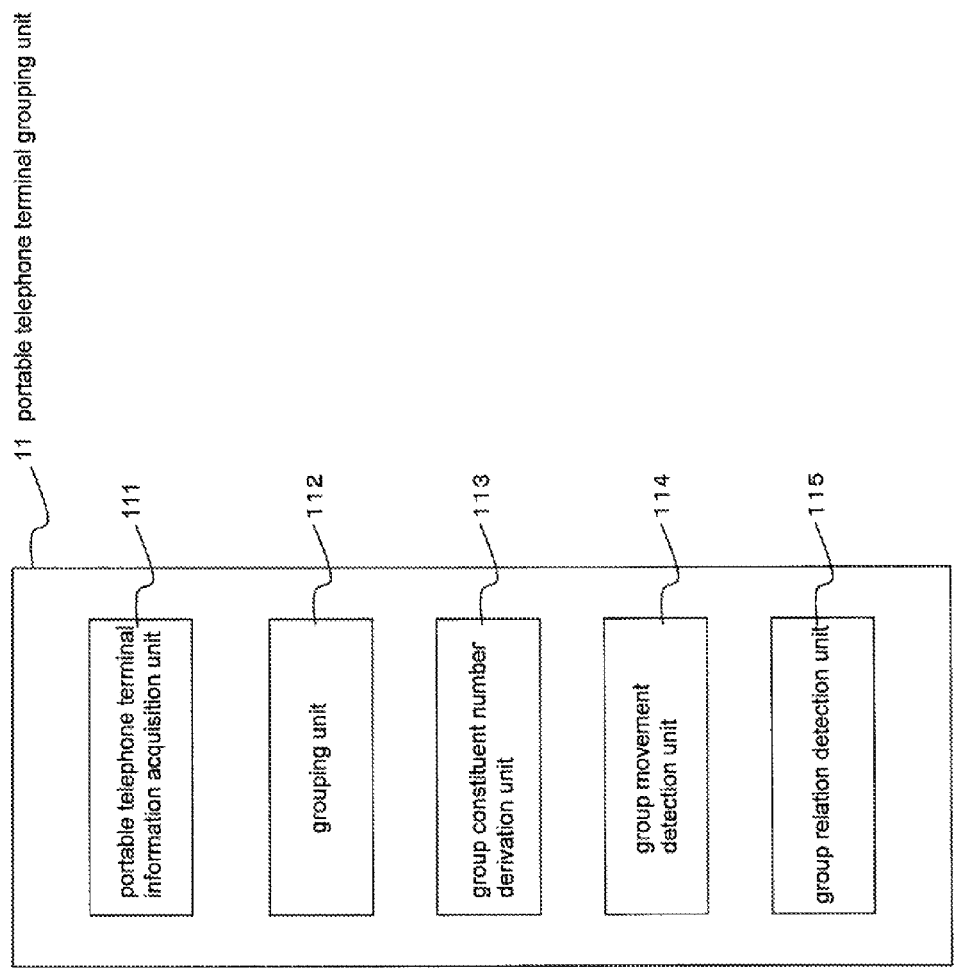
FIG. 2 is a block diagram showing an example of the configuration of the portable telephone terminal grouping unit shown in FIG. 1.

FIG. 2 is a block diagram showing an example of the configuration of portable telephone terminal grouping unit 11 shown in FIG. 1.

As shown in FIG. 2, portable telephone terminal grouping unit 11 shown in FIG. 1 is provided with: portable telephone terminal information acquisition unit 111, grouping unit 112, group constituent number derivation unit 113, group movement detection unit 114, and group relation detection unit 115.

Portable telephone terminal information acquisition unit 111 acquires various items of information of portable telephone terminals 4-1-4-n from portable telephone terminal individual information database 3 based on designated conditions that are applied as input from user terminal 7.

Grouping unit 112, based on the conditions designated from user terminal 7, performs grouping of various items of information of portable telephone terminals 4-1-4-n that were acquired by portable telephone terminal information acquisition unit 111.

Group constituent number derivation unit 113 derives the number of group constituents based on information that has undergone grouping by grouping unit 112.

Group movement detection unit 114 detects the movement of groups based on information that has undergone grouping by grouping unit 112.

Group relation detection unit 115 detects relations between groups based on information that has undergone grouping by grouping unit 112.

Portable telephone terminal grouping unit 11 conveys to portable telephone terminal display data creation unit 12 the results of each of grouping unit 112, group constituent number derivation unit 113, group movement detection unit 114, group relation detection unit 115 as information that has undergone grouping and detection results.

Portable telephone terminal display data creation unit 12 creates display data that accords with a request from user terminal 7 based on the grouped information and the detection results from portable telephone terminal grouping unit 11.

Figure 3:
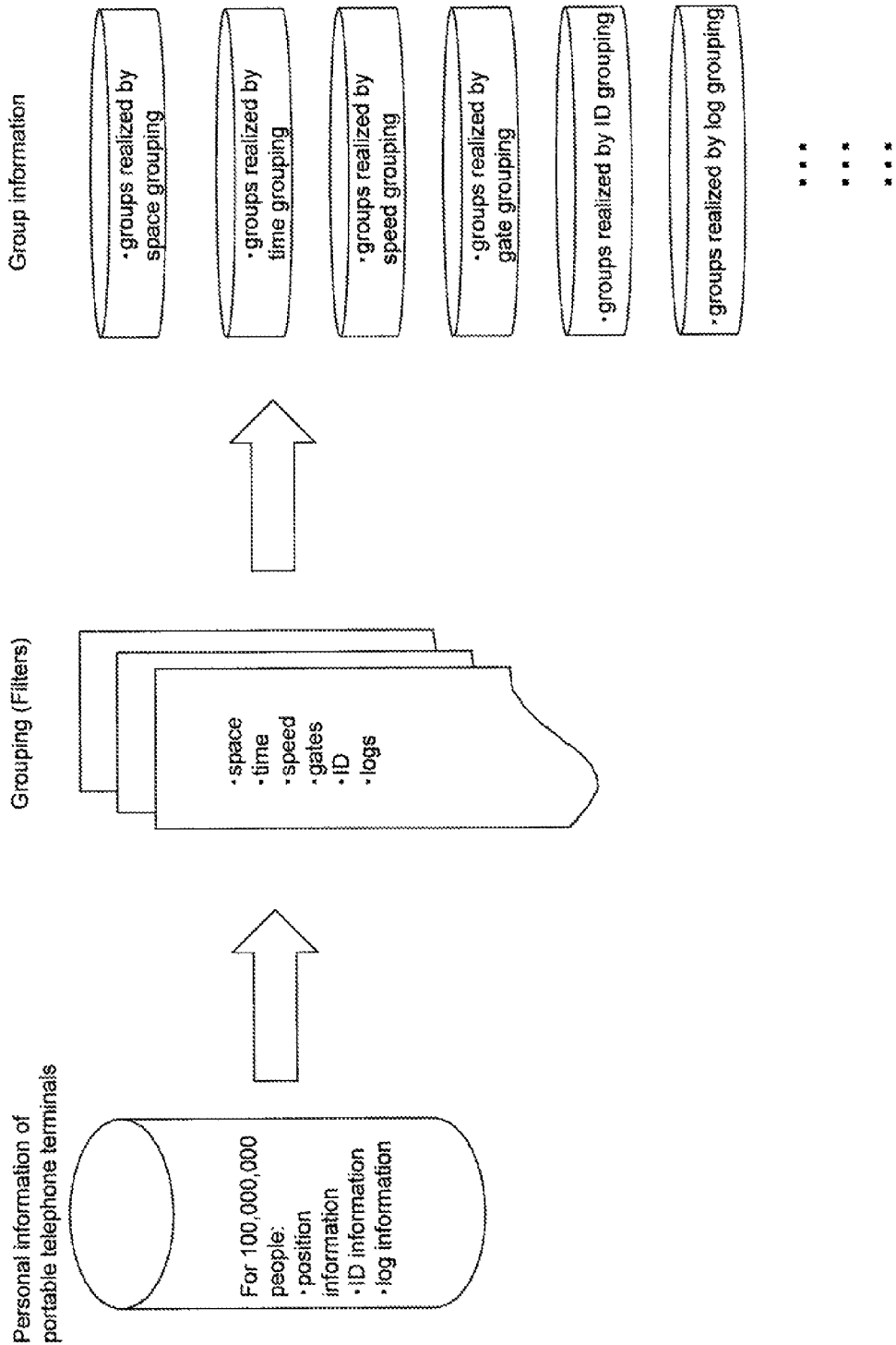
FIG. 3 shows the method of grouping personal information into group information in the grouping unit shown in FIG. 2.

FIG. 3 shows the method of grouping the personal information into grouped information in grouping unit 112 shown in FIG. 2.

The filters in FIG. 3 perform grouping of each of the portable telephone terminals by grouping data of the position information of each portable telephone terminal, identification information (ID number, name, age, gender, etc.), and log information relating to the communication state that are stored in portable telephone terminal individual information database 3 according to space conditions, time conditions, speed conditions, and gate conditions. In other words, in the filters, the data stored in portable telephone terminal individual information database 3 is subjected to grouping to create group information such as space groups, time groups, speed groups, gate groups, ID groups, and log groups.

Accordingly, in the present exemplary embodiment, the ID or location information of portable telephone terminals, which is personal information, can be grouped by the grouping process of these filters to be organized as information of an unspecified multiplicity of groups.

Figure 4:
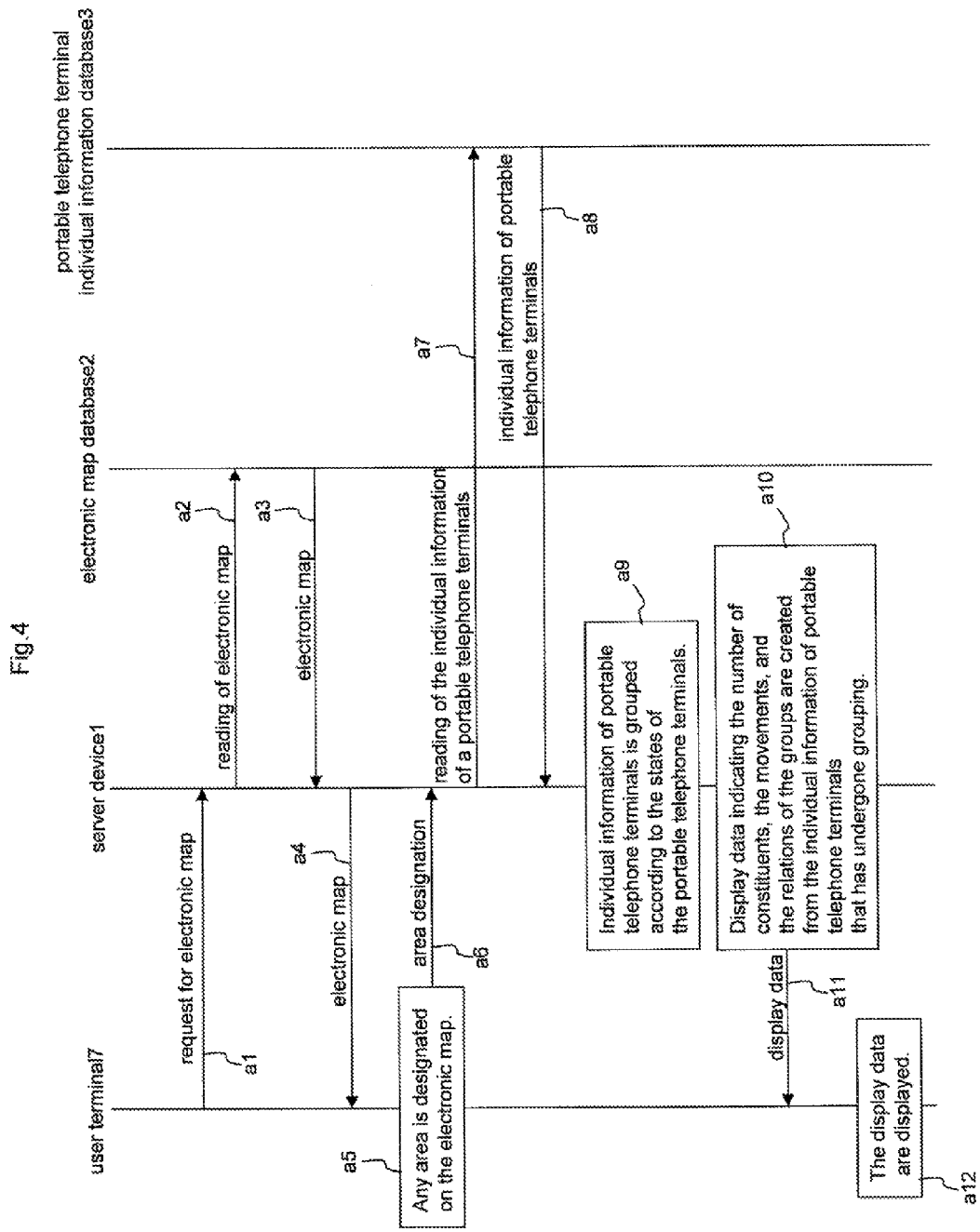
FIG. 4 is a sequence chart showing an example of the operations of the portable telephone information visualizing system according to the first exemplary embodiment of the present invention.

FIG. 4 is a sequence chart showing an example of the operation of the portable telephone terminal information visualizing system according to the first exemplary embodiment of the present invention. The operation of the portable telephone terminal information visualizing system according to the first exemplary embodiment of the present invention is next described by referring to these FIGS. 1-4.

Server device 1, upon receiving an electronic map request from user terminal 7 (a1 in FIG. 4), reads an electronic map from electronic map database 2 (a2 and a3 in FIG. 4) and sends the electronic map that was read to user terminal 7 (a4 in FIG. 4).

Next, in server device 1, when user terminal 7 designates any closed figure (area) on the electronic map to request information indicating the number of constituents, movement, or relations of the group in the closed figure (a5 and a6 in FIG. 4), portable telephone terminal information acquisition unit 111 in portable telephone terminal grouping unit 11 reads various items of information (individual information) of portable telephone terminals 4-1-4-n that relates to this closed figure from portable telephone terminal individual information database 3 (a7 and a8 in FIG. 4).

Next, in server device 1, grouping unit 112 in portable telephone terminal grouping unit 11 carries out grouping in accordance with the states of portable telephone terminals based on the individual information that was read by portable telephone terminal information acquisition unit 111 (a9 of FIG. 4).

In portable telephone terminal grouping unit 11, processing is carried out by each of group constituent number derivation unit 113, group movement detection unit 114, and group relation detection unit 115 based on the results of grouping by grouping unit 112 and the results are conveyed to portable telephone terminal display data creation unit 12, In server device 1, display data indicating the number of constituents, movement, and relations of groups that were grouped in portable telephone terminal grouping unit 11 is created in portable telephone terminal display data creation unit 12 (a10 of FIG. 4), and this display data is sent to user terminal 7 (a11 of FIG. 4).

User terminal 7 displays the display data that was sent on a display unit (not shown) (a12 of FIG. 4).

In the present exemplary embodiment, the user of user terminal 7 uses a function button or menu button, or alternatively, a touch pen or mouse to enclose the area he or she wishes to designate on the electronic map in user terminal 7 by a closed figure such as a circle or rectangle. User terminal 7 then transmits to server device 1 information of the latitude and longitude of the closed figure (area) that was created. In server device 1, the location information of the portable telephone terminal obtained by, for example, GPS (Global Positioning System) belonging to the common carrier and the information of the latitude and longitude of the closed figure (area) are collated and the number of portable telephone terminals present in the designated area are calculated.

For example, when the closed figure (area) is designated by a circle, the latitude and longitude of the center of the circle and radius R are sent from user terminal 7 to server device 1. Server device 1 then uses the position information of the portable telephone terminals of clients that is saved in server device 1 to measure the distance from the center of the circle to the positions of the portable telephone terminals and selects and performs grouping of those portable telephone terminals for which the distance is shorter than the radius R of the circle.

Server device 1 returns to user terminal 7 that submitted the request the number of portable telephone terminals in the group realized by grouping. Then, in the display unit of user terminal 7, the number of portable telephone terminals in the group realized by grouping is displayed inside the closed figure (area) that was designated on the electronic map or in the vicinity of the closed figure (area).

Figure 5:
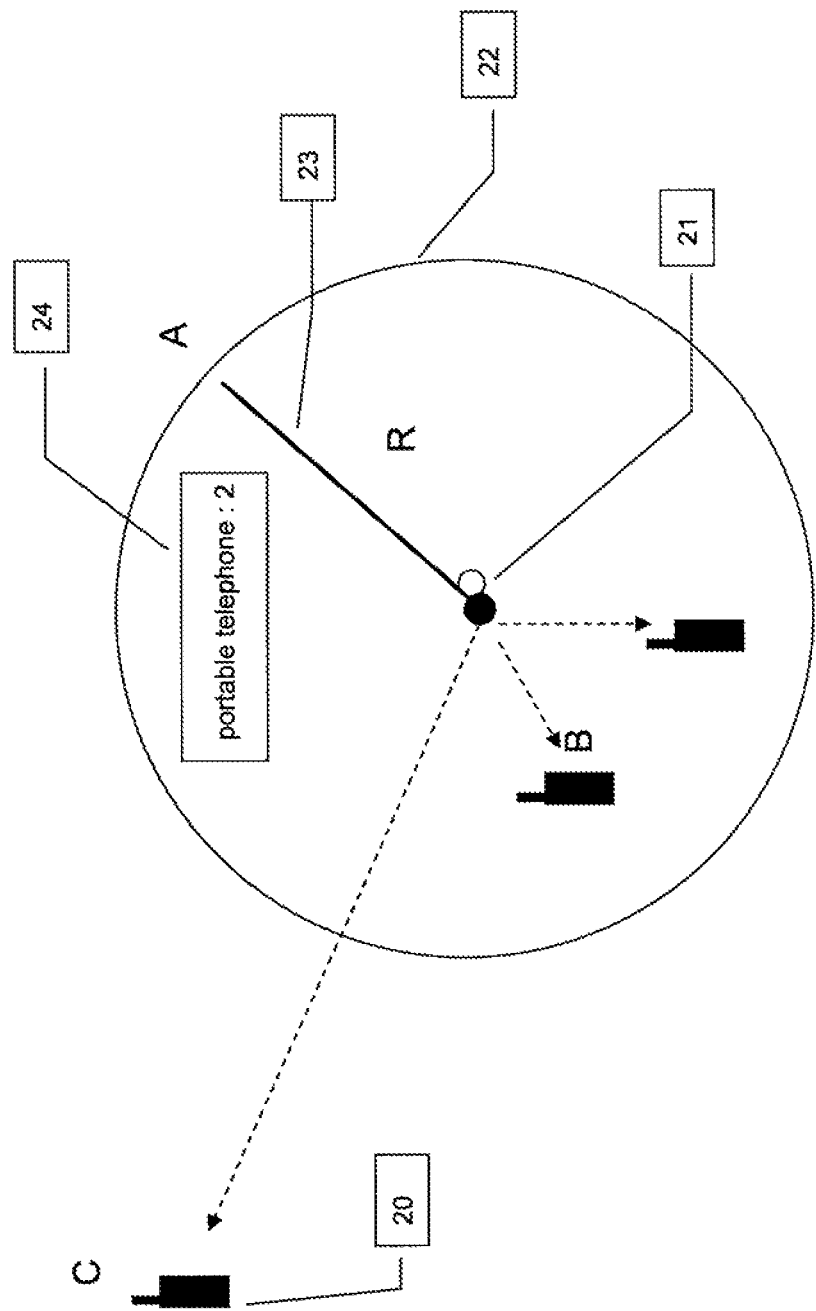
FIG. 5 shows an example of the display of grouping results of the information of portable telephone terminals according to the first exemplary embodiment of the present invention.

FIG. 5 shows an example of the display of the results of grouping information of portable telephone terminals realized by the first exemplary embodiment of the present invention. In the example shown in FIG. 5, an arbitrary closed figure on the electronic map is depicted by a circle, and the number of portable telephone terminals present in the closed figure (area) is shown.

The user of user terminal 7 first transmits to server device 1 the closed figure that is depicted on the electronic map that has the coordinates of latitude and longitude. Server device 1 collates the information of the closed figure that was sent from user terminal 7 with the position information of portable telephone terminals that is realized by, for example, a GPS that is held in portable telephone terminal individual information database 3.

Reference symbol O shown in FIG. 5 indicates the coordinates of the center of the circle. B and C are the positions of each portable telephone terminal. These positions are all represented by latitude and longitude. Reference symbol A is one point on the circumference, and OA is the radius R. OB and OC are the distances from the center of the circle to each of the portable telephone terminals. OB is shorter than the radius OA of the circle and the portable telephone terminal of point B is therefore inside the circle. In contrast, OC is longer than the radius OA of the circle, and the portable telephone terminal of point C is therefore outside the circle.

In FIG. 5, 20 indicates the position of a portable telephone terminal, 21 indicates the latitude and longitude of the center of the circle, 22 indicates the circle that encloses the designated area, 23 indicates the radius of the circle, and 24 indicates the number of portable telephone terminals in the designated area.

In the present exemplary embodiment, the number of portable telephone terminals present in a closed space realized by a circle drawn at any site on the electronic map is investigated as described hereinabove, and the results are returned to user terminal 7 that submitted the request (a personal computer or portable telephone terminal) and are displayed in the closed figure realized by a circle drawn on the electronic map.

Figure 6:
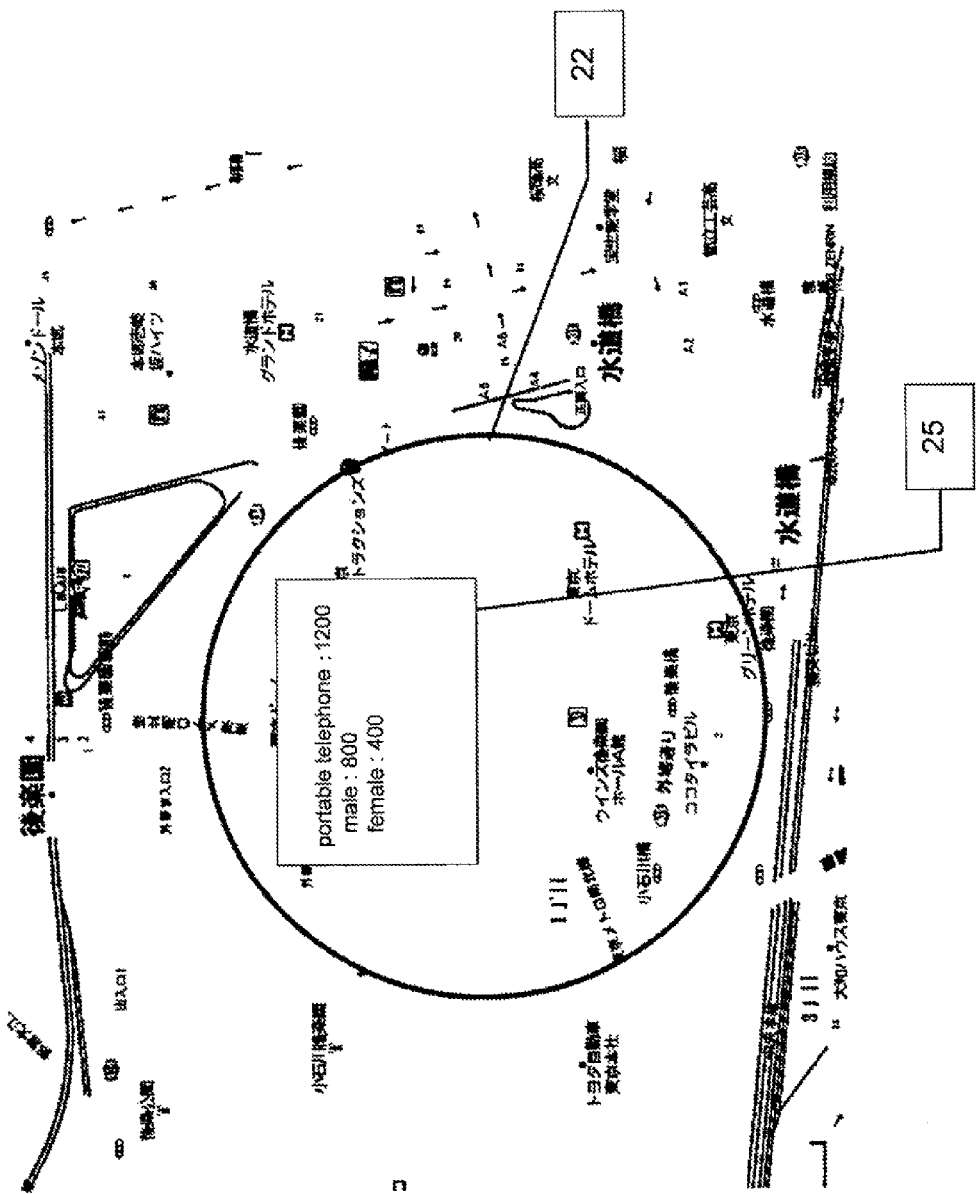
FIG. 6 shows another example of the display of grouping results of the information of portable telephone terminals according to the first exemplary embodiment of the present invention.

FIG. 6 shows an example of another display of the results of grouping information of portable telephone terminals realized by the first exemplary embodiment of the present invention. In the example shown in FIG. 6, an area on the electronic map is designated by a circle, and the number of portable telephone terminals present in this area is shown to be 1200.

In FIG. 6, 22 indicates the circle that encloses the designated area, 25 indicates the numbers of the portable telephone terminals of men and of women in the designated areas.

The number of portable telephone terminals in the area can be further classified by data (name, address, gender, age, etc.) associated with the individual identification numbers of the portable telephone terminals. In this case, the owners of the 1200 portable telephone terminals are shown to be men for 800 portable telephone terminals and women for 400 portable telephone terminals. Because the number of portable telephone terminals actually changes with the exit and entry into the area by people having portable telephone terminals, the numerical value is updated for each unit time interval.

Thus, in the present exemplary embodiment, the personal information (individual information) relating to portable telephone terminals 4-1-4-$n$ can be subjected to grouping as group information and offered as attractive content for the clients that are the subscribers of portable telephone terminals 4-1-4-$n$ to subscribe to this service on their own initiative. As a result, in the present exemplary embodiment, the personal information of users of portable telephones is converted to group information to enable use of this information by ordinary people.

Second Exemplary Embodiment

Figure 7:
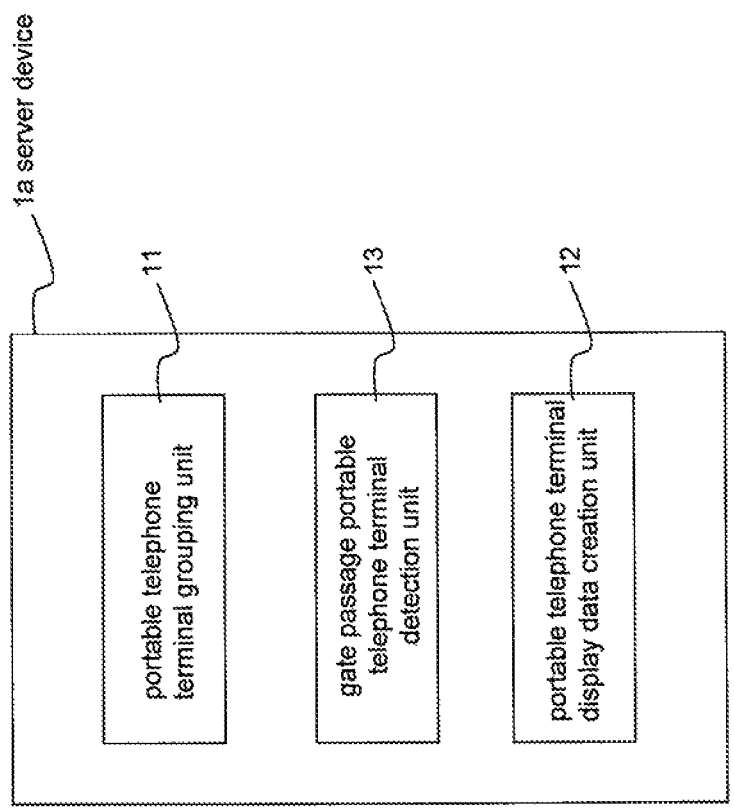
FIG. 7 is a block diagram showing an example of the configuration of the server device according to the second exemplary embodiment of the present invention.

FIG. 7 is a block diagram showing an example of the configuration of a server device according to the second exemplary embodiment of the present invention. In FIG. 7, server device 1$a$ is of the same configuration as server device 1 according to the first exemplary embodiment of the present invention shown in FIG. 1 with the exception of the addition of gate passage portable telephone terminal detection unit 13.

In the present exemplary embodiment, the closed figure is not seen as an area but rather considered to be a gate. Then, instead of portable telephone terminals that are present in the closed figure, portable telephone terminals that have passed through a gate are subjected to grouping. In this way, for example, the total number of portable telephone terminals that passed through a gate from a designated time T1 until time T2 can be returned to user terminal 7 (portable telephone terminal or personal computer) that submitted the request and displayed in the vicinity of exit agates designated on an electronic map.

Alternatively, a unidirectional gate in which the entrance and exit are clearly defined, a bidirectional gate in which the entrance and exit are not distinguished, and a total-circumference gate of 360 degrees as in a circle in which portable telephone terminals are counted regardless of the direction of passage can be designated, as necessary, as the gates in the present exemplary embodiment.

In the present exemplary embodiment, a gate at which only inflowing portable telephone terminals are counted can also be designated, as necessary, instead of as a gate at which only outflowing portable telephone terminals are counted as described hereinabove.

To enable the above-described processes, gate passage portable telephone terminal detection unit 13 detects portable telephone terminals that enter and exit each of the preset gates based on the position information of portable telephone terminals that is read from portable telephone terminal individual information database 3 and saves these detection results.

Portable telephone terminal grouping unit 11 performs grouping of portable telephone terminals that enter and exit each gate based on the detection results saved in gate passage portable telephone terminal detection unit 13. Portable telephone terminal grouping unit 11 further calculates the total number of portable telephone terminals that have entered and exited each gate within a time interval that is designated from user terminal 7.

Portable telephone terminal display data creation unit 12 creates display data for displaying, in the vicinity of gate exists that have been designated on electronic map, the total number of portable telephone terminals that was calculated in portable telephone terminal grouping unit 11.

Figure 8:
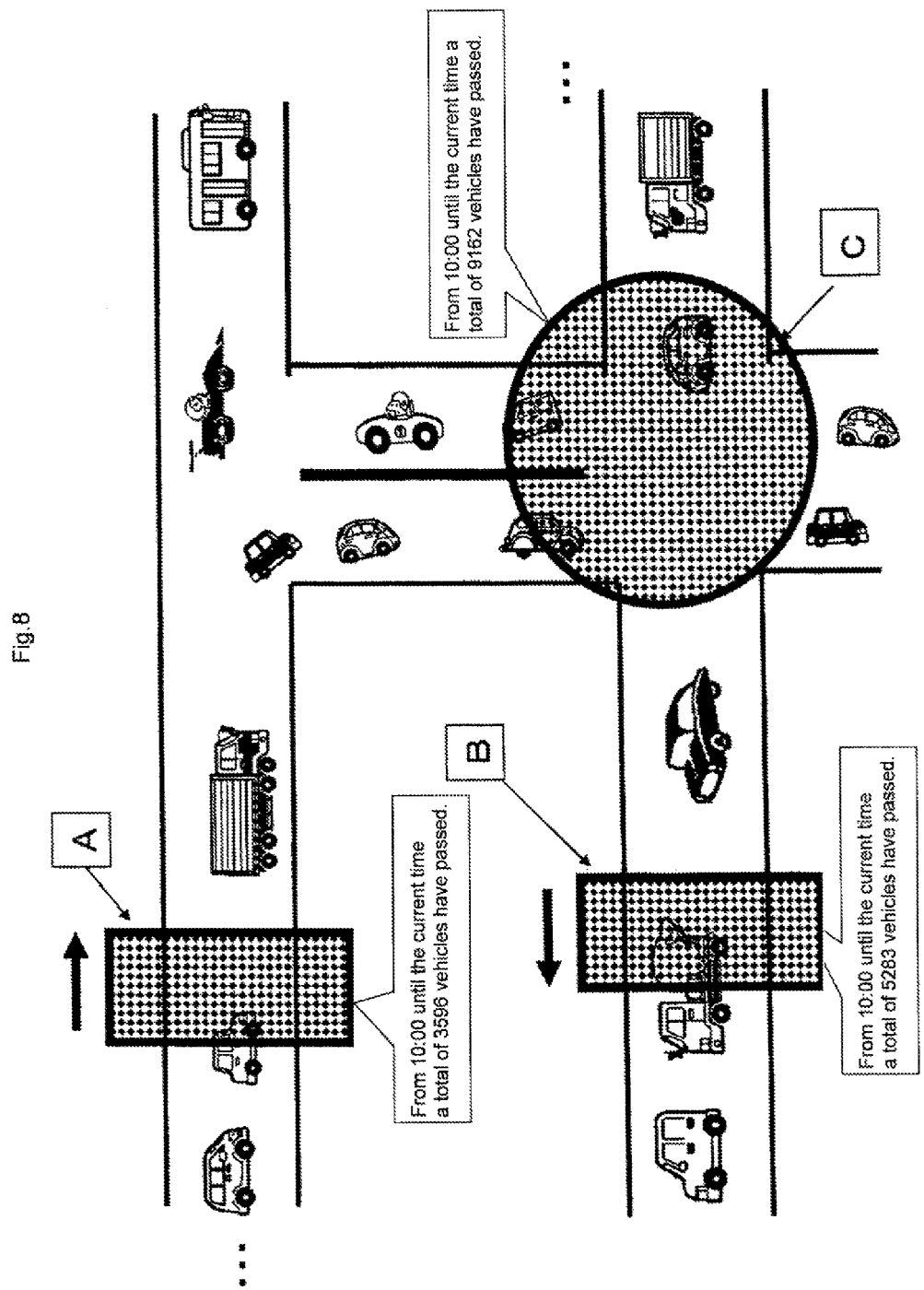
FIG. 8 shows an example of the display of the grouping results of the information of portable telephone terminals in which gates are combined in the second exemplary embodiment of the present invention.

FIG. 8 shows an example of the display of the grouping results of the information of portable telephone terminals that combines gates in the second exemplary embodiment of the present invention. In FIG. 8, an example is shown in which gates have been set at three sites on roads.

In FIG. 8, A is a gate of one-way traffic from left to right, B is a gate of one-way traffic from right to left, and C is a total-circumference gate. The user of user terminal 7 must consider the flow of traffic or traffic lanes according to his or her object to select and set up the optimum gates.

In the present exemplary embodiment, a plurality of gates are set up as shown in FIG. 8, and the number of portable telephone terminals that pass through gate A can be found, but by applying a logical operation to the total number of these portable telephone terminals, the number of portable telephone terminals that, for example, pass through Gate A and moreover pass through Gate B can also be found. In addition, the number of portable telephone terminals that pass through Gate A, and moreover, that pass through Gate C but do not pass through Gate B can also be found.

Third Exemplary Embodiment

Figure 9:
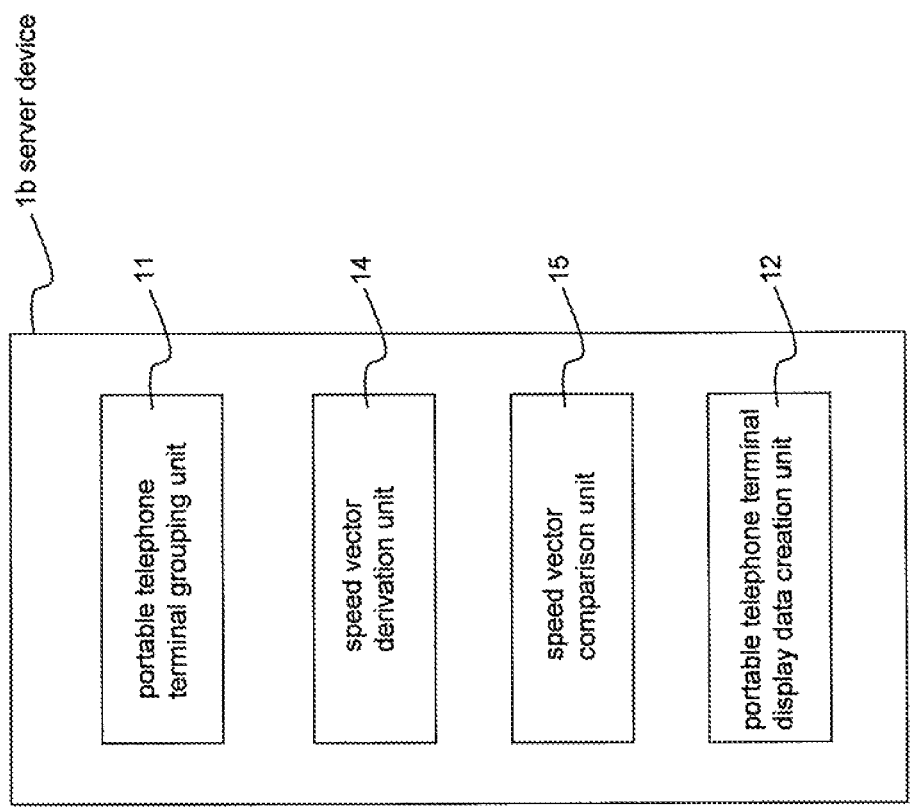
FIG. 9 is a block diagram showing an example of the configuration of the server device according to the third exemplary embodiment of the present invention.

FIG. 9 is a block diagram showing an example of the configuration of the server device according to the third exemplary embodiment of the present invention.

In FIG. 9, server device 1$b$ is of the same configuration as server device 1 according to the first exemplary embodiment of the present invention shown in FIG. 1 with the exception of the addition of speed vector derivation unit 14 and speed vector comparison unit 15.

Speed vector derivation unit 14, based on position information of portable telephone terminals read from portable telephone terminal individual information database 3, derives speed vectors produced by the movement on foot, by automobile, or by train of people carrying portable telephone terminals 4-1-4-$n$ as the speed vectors of each portable telephone terminal from the change per unit time of GPS position information or from the Doppler frequency of the response signals of portable telephone terminals 4-1-4-$n$.

Speed vector comparison unit 15 compares the speed vectors derived by speed vector derivation unit 14 and transfers the comparison results to portable telephone terminal grouping unit 11.

Based on the comparison results of speed vector comparison unit 15, portable telephone terminal grouping unit 11 groups together as one group those constituents having speed vectors of the same size.

Portable telephone terminal display data creation unit 12 creates display data such that tracking results of these groups are displayed on an electronic map.

Figure 10:
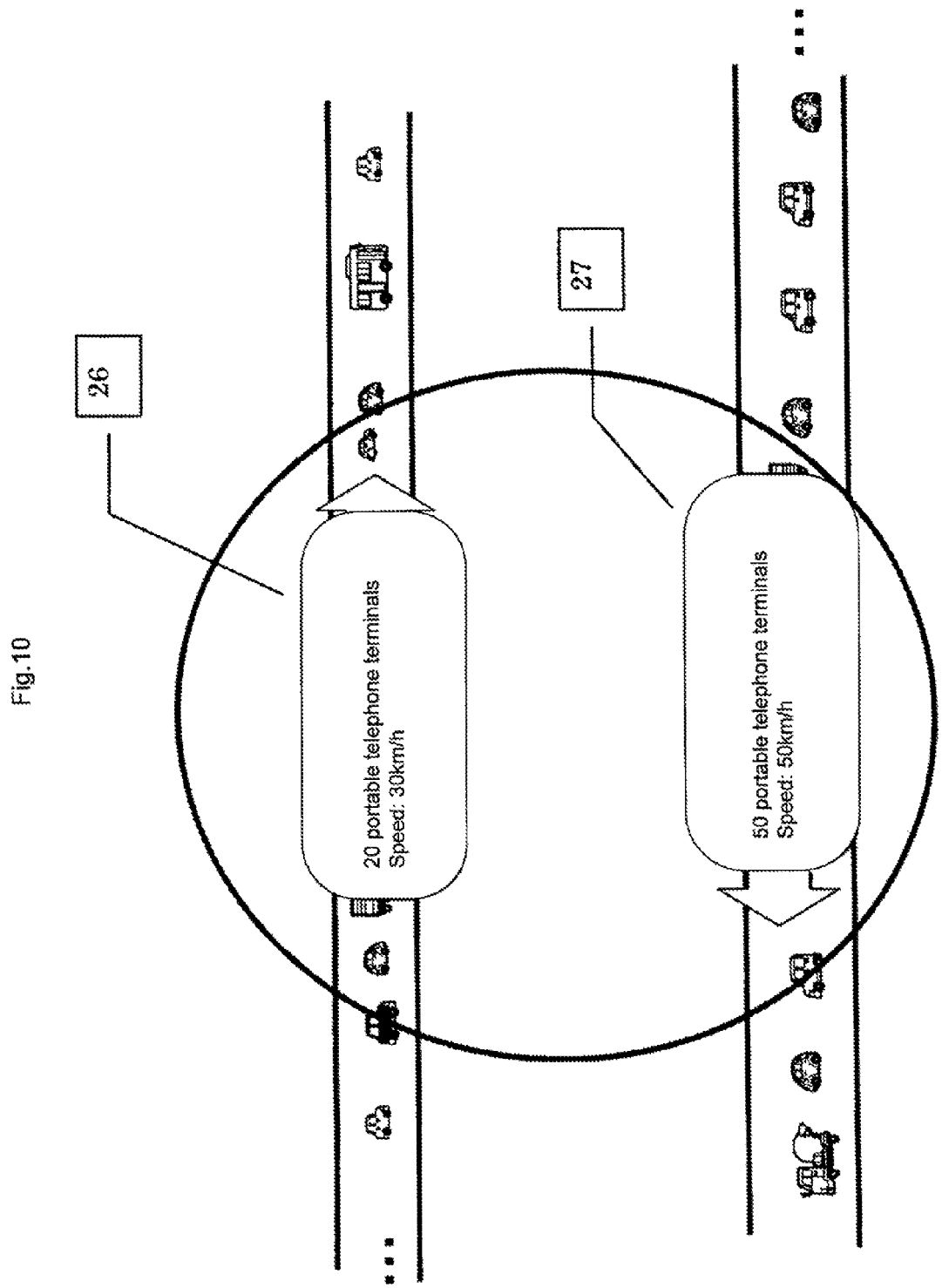
FIG. 10 shows an example of the display of grouping results in the third exemplary embodiment of the present invention.

FIG. 10 shows an example of the display of the grouping results in the third exemplary embodiment of the present invention.

FIG. 10 shows vector sets on a road, designates a circular area on a road on an electronic map, and indicates the number of portable telephone terminals present in this area. Reference numbers 26 and 27 shown in FIG. 10 indicate speed vector sets.

In the first exemplary embodiment of the present invention shown above, a scalar representation is given of the content shown in FIG. 10 in which 70 portable telephone terminals are shown. In the present exemplary embodiment, however, a vector representation is given, whereby vectors having different directions and speeds are in separate groups. Thus, as shown in FIG. 10, the state is represented as 20 terminals moving at a speed of 30 km/h toward the right in the figure and 50 terminals moving at a speed of 50 km/h toward the left in the figure.

Figure 11:
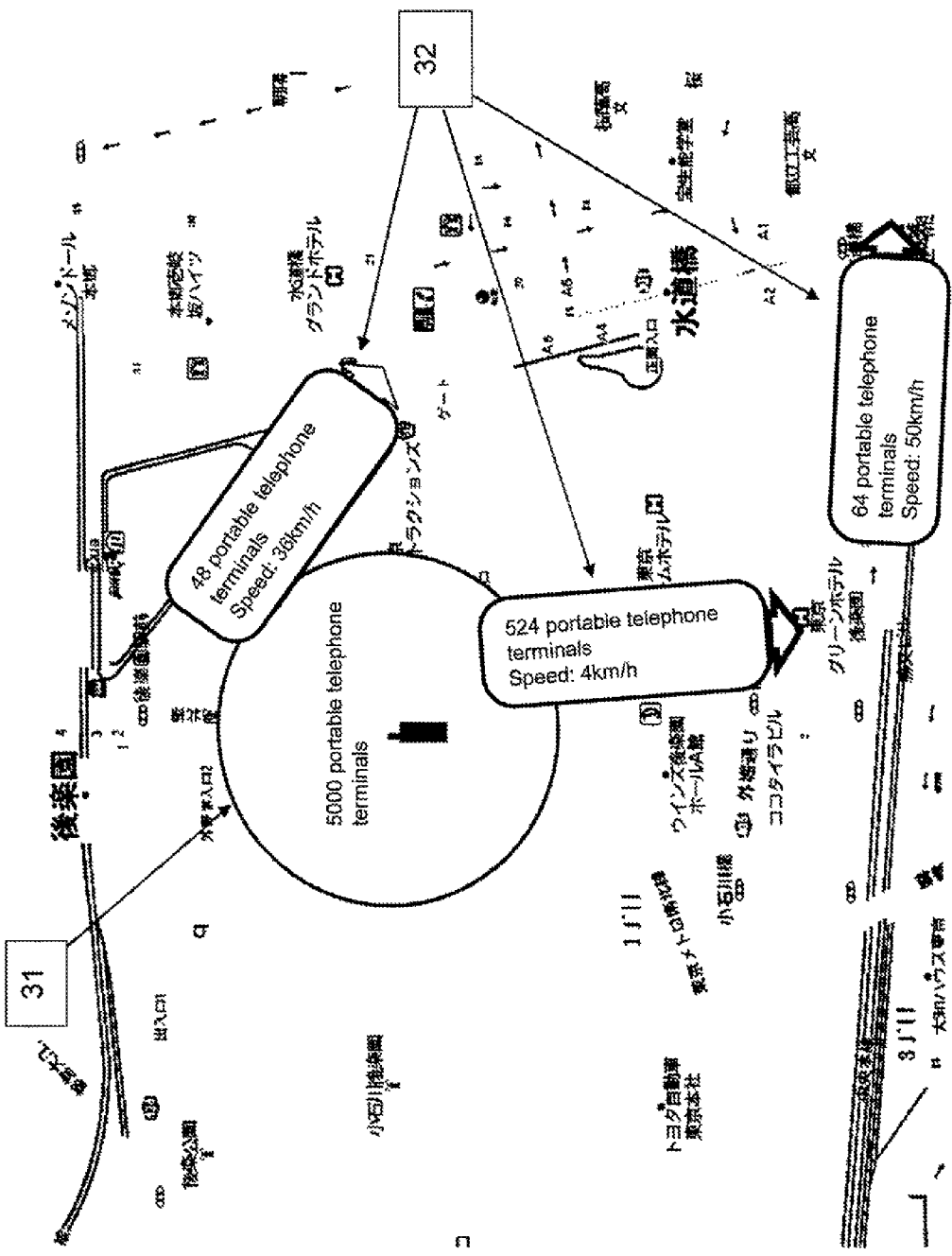
FIG. 11 shows another example of the display of grouping results in the third exemplary embodiment of the present invention.

FIG. 11 shows an example of another display of the grouping results in the third exemplary embodiment of the present invention. In FIG. 11, 31 indicates the designated area, 32 indicates each of the speed vector groups that flow from the designated area.

In FIG. 11, the vector sets that flow from a designated area are shown, and although the number of portable telephone terminals in the designated area is 5000, groups are formed for each speed vector and the state of outflow from the designated area is shown (31 in FIG. 11). In this case, by coloring the designated area with a predetermined color (for example, red), the portable telephone terminals that flow out of the designated area can be visually tracked by the same color red.

In the example shown in FIG. 11, a state is shown in which 64 portable telephone terminals are moving toward the east at a speed of 50 km/h, 48 portable telephone terminals are moving toward the east southeast at a speed of 36 km/h, and 524 portable telephone terminals are moving toward the south at a speed of 4 km/h. Accordingly, it can be conjectured that 64 portable telephone terminals are moving by train, 48 portable telephone terminals are moving by bus or car, and 524 portable telephone terminals are moving on foot.

Thus, in the present exemplary embodiment, setting a closed area on a road and giving a vector representation of the portable telephone terminals that are present in the closed area enables the state of congestion in any location to be easily grasped. Essentially, in the present exemplary embodiment, not only can groups into which portable telephone terminals have been grouped be shown by scalar expression, but information such as the direction and speed that groups are moving can also be visualized by vector expression.

In other words, to implement speed grouping in the present exemplary embodiment, speed vectors produced when portable telephone terminals are moving (calculated by measuring change in GPS position signals or the Doppler frequency of response signals of portable telephone terminals) are used to group portable telephone terminals present in a closed figure designated on an electronic map into groups of portable telephone terminals for which the direction and size of speed vectors are the same.

In the present exemplary embodiment, when the number of portable telephone terminals of a group that has undergone grouping exceeds a fixed value that has been set, the portable telephone terminals are registered as a new speed vector group, this speed vector group being displayed by any figure, the movement direction of the speed vector group being displayed by an arrow and the speed expressed by a number (see FIG. 11).

In the present exemplary embodiment, designating any area on a road by the above-described method and displaying portable telephone terminals that are present in this area by vectors clearly indicates the number and speed of portable telephone terminals in this area, whereby the state of congestion of traffic in this area can be comprehended.

In the present exemplary embodiment, moreover, when the speed vector group is faster than a fixed speed (for example, when faster than 6 km/h), the group can be judged and displayed as a group in cars if close to a road on the electronic map and can be judged and displayed as a group on board a train if close to a railroad.

In the present exemplary embodiment, when a speed vector group that has been subjected to grouping and registered as described above gradually separates and the number of portable telephone terminals that make up the group decreases, the residences or workplaces of the owners of the portable telephone terminals can be discerned. As a result, from the standpoint of protecting personal information, the display of this group can be displayed as bursting like a balloon and thus terminated at the time that the number of portable telephone terminals of the speed vector group falls below a fixed value that has been set.

Fourth Exemplary Embodiment

Figure 12:
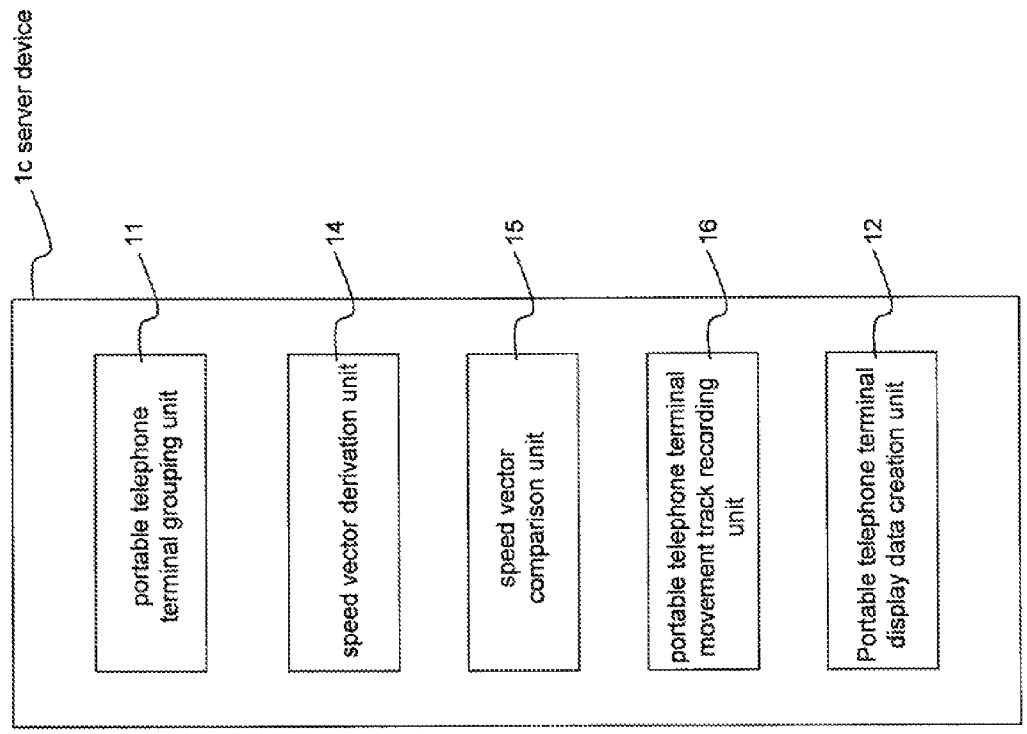
FIG. 12 is a block diagram showing an example of the configuration of the server device according to the fourth exemplary embodiment of the present invention.

FIG. 12 is a block diagram showing an example of the configuration of the server device according to the fourth exemplary embodiment of the present invention.

In FIG. 12, server device 1*c* is of the same configuration as server device 1*b* according to the third exemplary embodiment of the present invention shown in FIG. 9 with the exception of the addition of portable telephone terminal movement track recording unit 16.

Portable telephone terminal movement track recording unit 16 records the track of speed vector group A that has undergone grouping by portable telephone terminal grouping unit 11 based on the results of speed vector derivation unit 14 and speed vector comparison unit 15.

Portable telephone terminal grouping unit 11 draws a line orthogonal to the track of speed vector group A that was recorded in portable telephone terminal movement track recording unit 16 and groups all portable telephone terminals that are at a distance for which the length of the line from the track is shorter than distance R.

Portable telephone terminal display data creation unit 12, based on the number n of the portable telephone terminals of the group that has undergone grouping, creates display data for displaying $A(R)=n$ behind speed vector group A on the electronic map.

In the present exemplary embodiment, moreover, because the display of the group in which $A(R)=n$ as a group with clear borders is at times problematic, the group can in such cases be displayed not only by vector display but also as an image such as dispersing smoke or flowing water.

Figure 13:
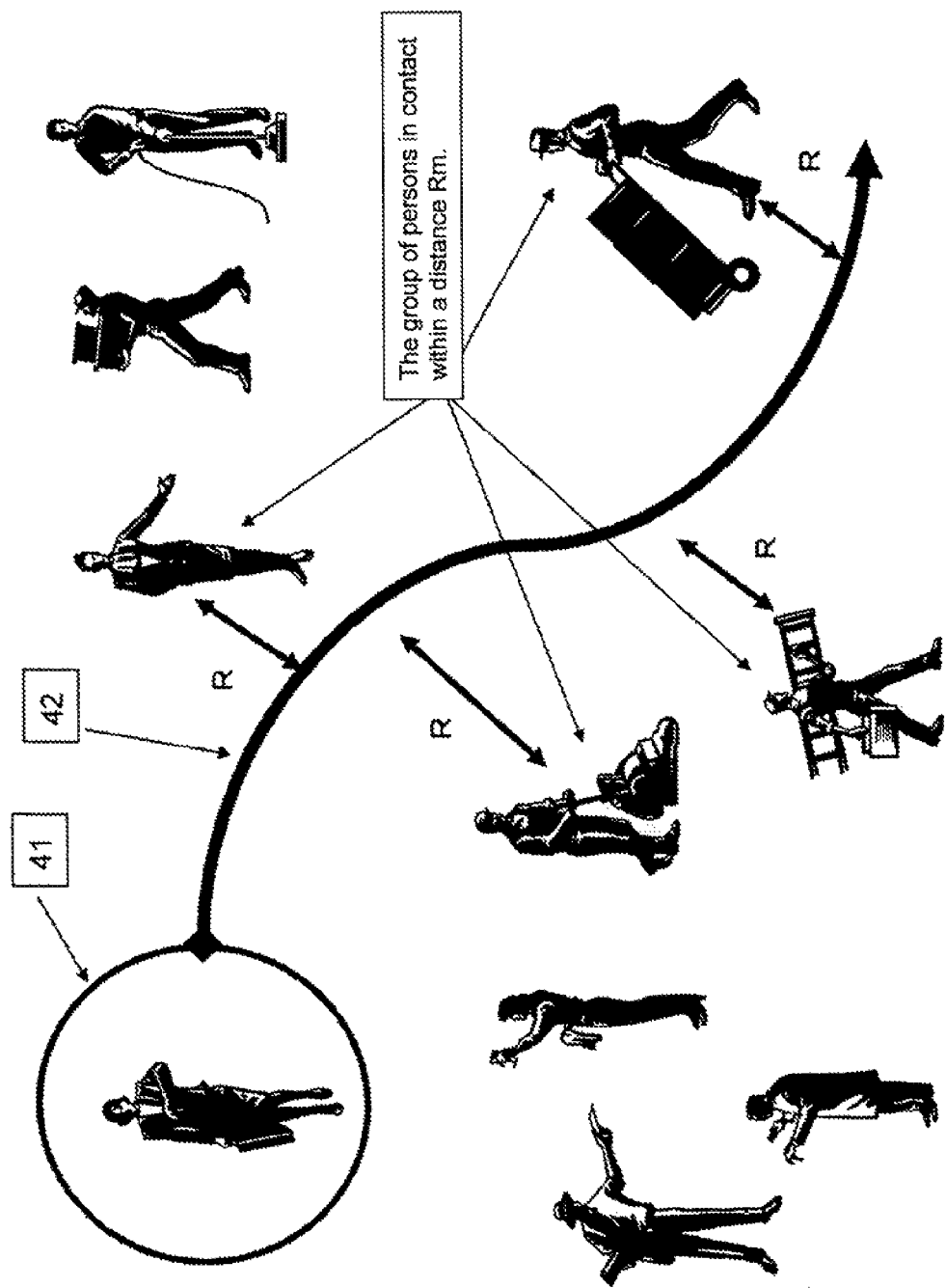
FIG. 13 shows an example of the display of grouping results in the fourth exemplary embodiment of the present invention.

FIG. 13 shows an example of the display of grouping results in the fourth exemplary embodiment of the present invention. In FIG. 13, 41 indicates speed vector group A, and 42 indicates the track of speed vector group A.

In the example shown in FIG. 13, if reference number 41 is assumed to be the set of a person infected with, for example, avian influenza, reference number 42 is the track of movement of the infected person. In the present exemplary embodiment, lines are drawn orthogonal to this track, people at distance R (for example, less than 5 m) from this track are assumed to be people suspected of having contact with the infected person, and these people are grouped. In this way, a group of people prone to infection by the disease can be recognized and tracked.

Thus, in the present exemplary embodiment, when a portable telephone terminal moves, portable telephone terminals present in the vicinity of the track of this portable telephone terminal are grouped. In this way, appropriate information relating to people who potentially contacted an infected person or the path of movement of a person infected with an infectious disease can be obtained.

Fifth Exemplary Embodiment

Figure 14:
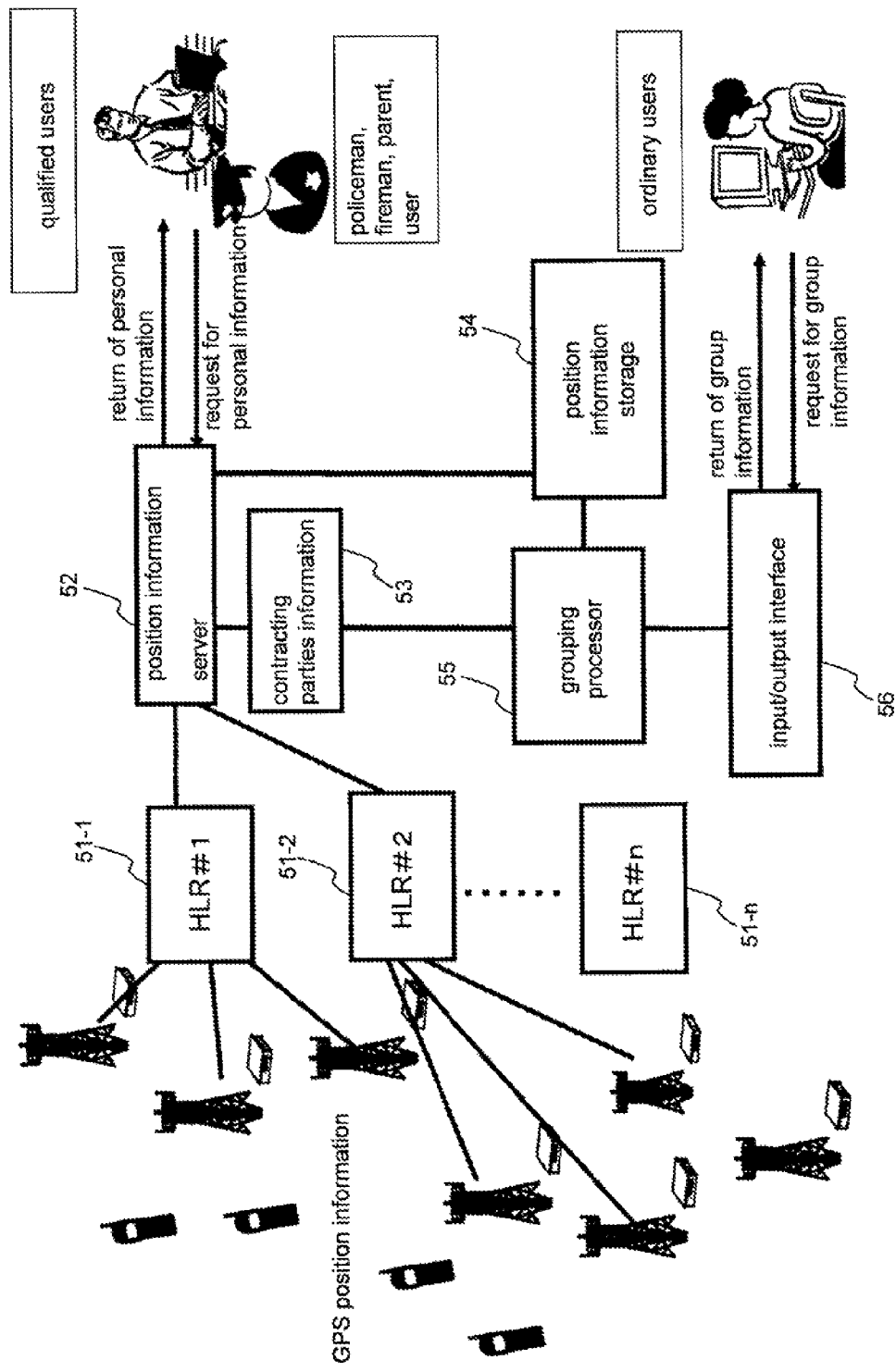
FIG. 14 is a block diagram showing an example of the configuration of the portable telephone information visualizing system according to the fifth exemplary embodiment of the present invention.

FIG. 14 is a block diagram showing an example of the configuration of the portable telephone terminal information visualizing system according to the fifth exemplary embodiment of the present invention. In FIG. 14, a system is shown that groups personal information of portable telephone terminals into group information.

The greater portion of the system, according to the present exemplary embodiment, consists of an already existing system possessed by a common carrier of portable telephone terminals. This existing system is already used to implement, as services to limited users, such services as automatically displaying the current location of a person that has telephoned the fire department, reporting the current location of the user, and reporting the location of a child to his parent.

In FIG. 14, the portable telephone terminal information visualizing system according to the fifth exemplary embodiment of the present invention is provided with: HLR (Home Location Registers)(#1-#n) 51-1-51-$n$, position information server 52, contracting parties information 53, position information storage 54, grouping processor 55, and input/output interface 56.

In the example shown in FIG. 14, when there is a request from a qualified user (such as a policeman, firefighter, parent, or the user) to position information server 52 for personal information, the personal information is returned in response to the request. When there is a request for group information from an ordinary user to input/output interface 56, the group information is returned in response to the request.

HLR (#1-#n) 51-1-51-$n$, position information server 52, and contracting parties information 53 are an existing system maintained by a common carrier of the portable telephone terminals. In the present exemplary embodiment, grouping processor 55 is added to this existing system, and personal information of portable telephone terminals is grouped by, for example, space, time, and speed. The present exemplary embodiment is further provided with a voluminous storage (position information storage 54) for storing for a certain time interval position information of each portable telephone terminal and an interface (input/output interface 56) that joins the system with a user terminal such as a portable telephone terminal or personal computer when a user requests group information.

The present exemplary embodiment is configured such that position information of portable telephone terminals is recorded in position information storage 54 and then read as necessary. Using past position information that was recorded in this position information storage 54, portable telephone terminals that are present in a closed figure on an electronic map are grouped at a designated past time rather than at the current time. The number of portable telephone terminals of the group at the past time that was grouped is then returned to the user terminal such as a portable telephone terminal or personal computer that issued the request and displayed either inside the designated closed figure or close to the closed figure on an electronic map.

Typically, patients with infectious diseases show symptoms of the disease several days after entering Japan. In such cases, position information of the portable telephone terminal several days before when the infected person entered Japan can be obtained from above-described position information storage 54 and the above-described contact group can be recognized based on past position information.

Thus, in the present exemplary embodiment, the most effective countermeasures such as disinfection or quarantine that targets prevention of the spread of an infectious disease can be implemented. In addition, the present exemplary embodiment enables a return to the point in time at which a crime occurred and the reconstruction of the scene of the crime. As a result, the status of the portable telephone terminal of an offender or a witness that was in the vicinity can be reproduced, whereby the effect of improving criminal arrest rates is obtained.

Sixth Exemplary Embodiment

Figure 15:
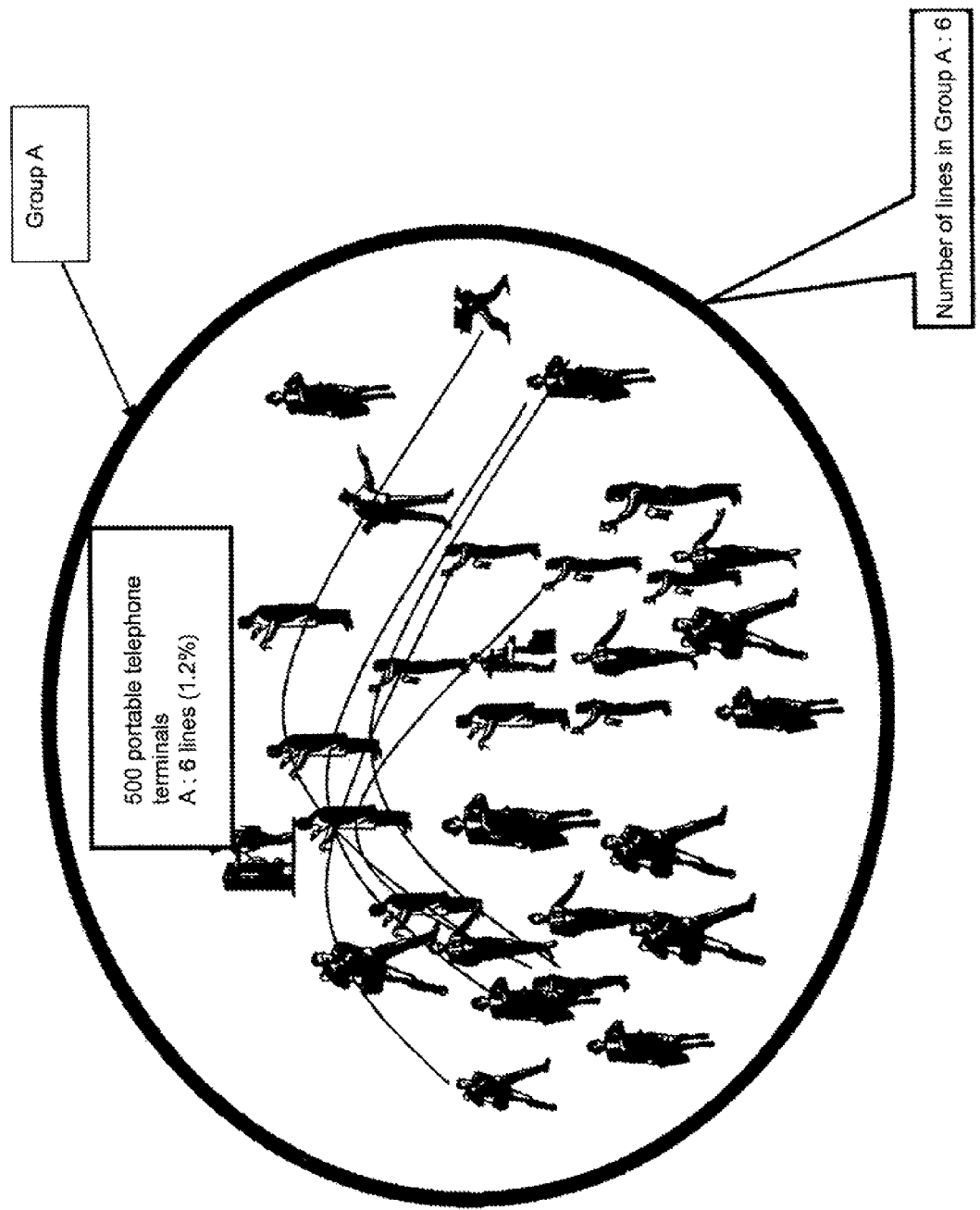
FIG. 15 is a view for describing the in-group correlation according to the sixth exemplary embodiment of the present invention.
Figure 16:
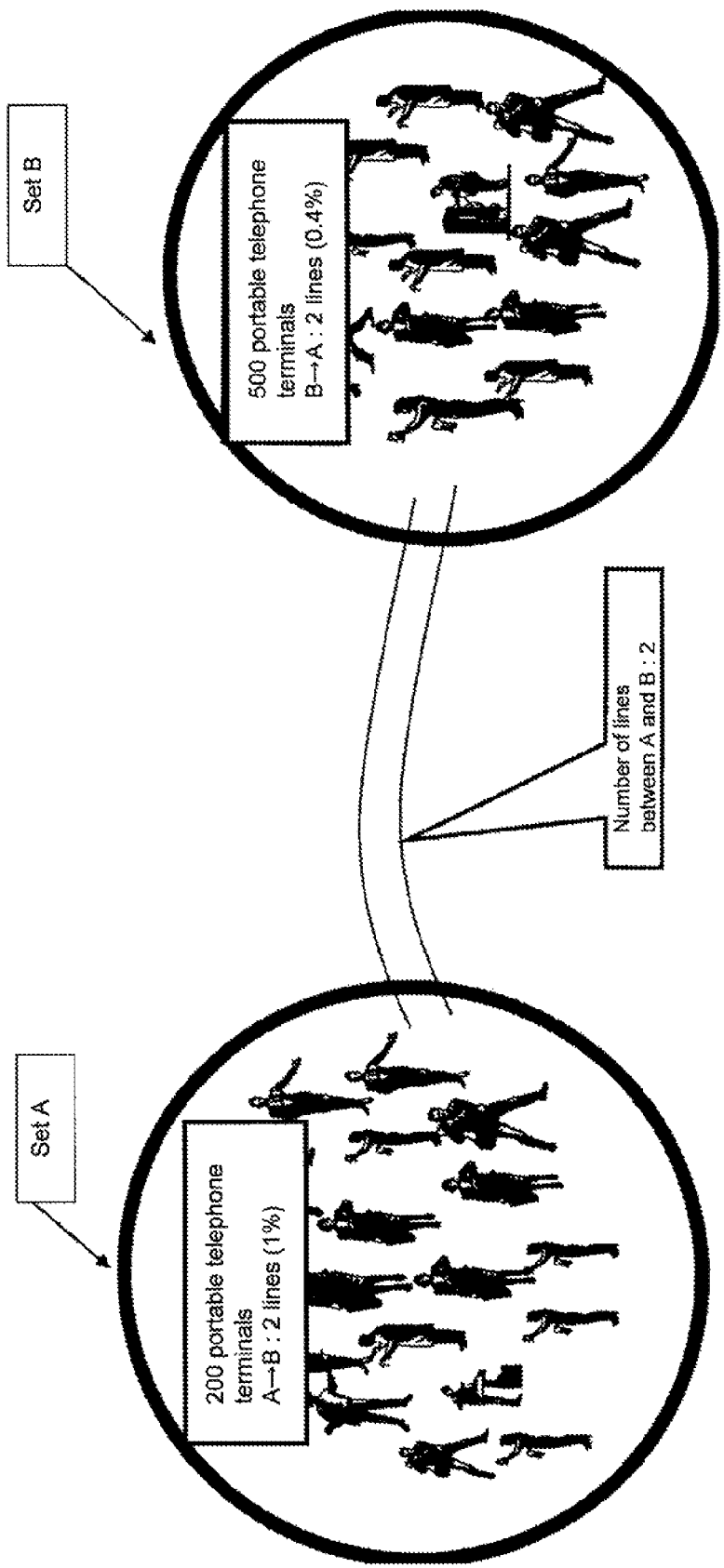
FIG. 16 is a view for explaining the inter-group correlation according to the sixth exemplary embodiment of the present invention.

FIG. 15 is a view for explaining in-group correlations by means of the sixth exemplary embodiment of the present invention. FIG. 16 is a view for explaining inter-group correlations by means of the sixth exemplary embodiment of the present invention. The configuration of the portable telephone terminal information visualizing system according to the sixth exemplary embodiment of the present invention is of the same configuration as the portable telephone terminal information visualizing system according to the first exemplary embodiment of the present invention shown in FIG. 1, and redundant explanation is therefore here omitted.

The degree of correlation that corresponds to the degree of intimacy between constituent members in the same group described hereinbelow and the degree of correlation that corresponds to the degree of intimacy between different groups are calculated by group constituent number derivation unit 113, group movement detection unit 114, and group relation detection unit 115 in portable telephone terminal grouping unit 11 of server device 1 according to the first exemplary embodiment of the present invention shown in FIG. 2. As a result, representation of the server device according to the present exemplary embodiment is omitted from the figures.

FIG. 15 shows the degree of correlation that corresponds to the degree of intimacy between constituent members in the same group. Here, the number of lines in which communication is taking place within the group is investigated, and the degree of correlation is represented by the number obtained by dividing the number of these lines by the number of portable telephone terminals of the group. In this case, simply recording both the number of portable telephone terminals and the number of lines is also possible when the degree of correlation of constituent members in the same group is represented by %. In the example shown in FIG. 15, the number of portable telephone terminals of the group is 500 and six lines are currently busy, whereby the degree of correlation is 0.012 or 1.2%.

FIG. 16 shows the degree of correlation that corresponds to the degree of intimacy between different groups. Here, the number of lines that are currently engaged in communication between Group A and Group B is investigated, and the degree of correlation is represented by a number obtained by dividing the number of lines by the number of portable telephone terminals of the groups. In the example shown in FIG. 16, two lines are busy between Group A and Group B, Group A has 200 portable telephone terminals, and Group B has 500 portable telephone terminals. Accordingly, the degree of correlation of Group B as seen from Group A is 1%, and the degree of correlation of Group A as seen from Group B is 0.4%.

The degree of correlation can be judged by the communication state at a particular point in time as described above, but measuring over a certain time interval is more suitable for arriving at an accurate degree of correlation.

Still further, implementing an AND, OR, or NAND logical operation upon groups that have been grouped by the various conditions described above enables grouping based on even more complex conditions and allows greater freedom in creating groups that a user might desire. Thus, in addition to the state of congestion of roads, the real-time number of visitors to a department store or station, the behavior of people at the scene at which a serious accident has occurred, and reconstruction of the scene of an incident that occurred in the past, the present exemplary embodiment features the provision of a variety of complex applications by simple operations, such as a group that has passed through Gate A and Gate C without passing through Gate B.

The present invention uses communication logs of portable telephones and, by dividing the number of conversations or emails between portable telephones in a group or the number of conversations or emails between Group A and Group B by the number of portable telephone terminals, i.e., the denominator of groups, features the display of not only independent relations, but also the depth of relations within groups or between one group and another group.

Thus, in the present exemplary embodiment, the use of information of the status of portable telephone terminals (power ON or power OFF, busy or in standby, the connection destination of a busy line, the transmission destination of email, the state of connection with an Internet site, etc.) enables the analysis and display of the degree of correlation within a group or the degree of correlation between one group and another in a group realized by grouping under the various conditions according to the above-described first to fifth exemplary embodiments of the present invention.

Thus, by utilizing information maintained by a common carrier of portable telephone terminals (gender, occupation, age, address, family, etc.) or the status of portable telephone terminals (such as busy or not), the present invention enables classification into a variety of groups and the acquisition of information of the characteristics or movements of these various groups.

Still further, by using communication logs of portable telephone terminals, the present invention enables the acquisition of information relating to the depth of the relation (number of busy lines/number of portable telephone terminals) within a group or between one group and another group.

In the present invention, combining the methods according to each of the above-described exemplary embodiments enables the acquisition of information of the state of congestion of every road in Japan, the state of daytime and nighttime movement of the population of a city, or the real-time number of visitors to a department store, event location, or baseball stadium. Information of the origins of these visitors, the destinations of their return, or the differences in behavior by male and female groups can also be obtained. Various information can further be obtained regarding the behavior of people at the scene of the occurrence of a serious accident, the state of the location of an incident that occurred in the past, the route of infection of the victim of an infectious disease, or the depth of relations between one group and another group.

To implement grouping of information associated with portable telephone terminals, the present invention groups portable telephone terminals that are present in a closed figure by information such as the name, age, or gender that is associated with the identification number of a portable telephone terminal, and then causes the number of portable telephone terminals of a group that has undergone grouping to be returned to the user terminal such as a portable telephone terminal or a personal computer that submitted the request and to be displayed on an electronic map.

If the number of accesses to Internet sites or the number of visits to landmarks is recorded in logs of portable telephone terminals in the future, the present invention will be able to use this information to perform an even greater variety of grouping.

To carry out grouping of the status information of portable telephone terminals in the present invention, portable telephone terminals that are present in a closed figure are grouped according to the portable telephone terminal status (such as busy or standby), and the number and status of portable telephone terminals of groups that have undergone grouping are returned to the user terminal such as a portable telephone terminal or personal computer that submitted the request for the information and are displayed on an electronic map.

Still further, in the present invention, groups that have undergone grouping by the methods of each of the above-described exemplary embodiments experience, together with change in time, changes in the number of portable telephone terminals in a space, the speed vectors of groups, or the communication states of portable telephone terminals, and these changes can therefore be updated for each unit time interval.

In the present invention, a closed figure that encloses a designated area can be displayed in a predetermined color (for example, red), and groups having the same speed vector that flow from this area can be displayed by the same color as the closed figure even when several groups are formed in various directions.

When an area displayed by the above-described red color is continuously designated, and the constituent element portable telephone terminals of the same speed vectors that flow from this area repeatedly disperse and assemble and thus exceed or fall below a set number, the figures that represent these groups can also be caused to disappear or be displayed accordingly.

When a designated area is cancelled, the figures of all of the groups that flow from this designated area can also be caused to disappear.

In the present invention, by setting an area B that contains a designated area A and that is larger than area A, by examining the vectors of the number Z of portable telephone terminals that are present in area B, by selecting vectors directed toward A within Z, and by displaying this number, the origins and number of people that are heading in the direction of A can be discerned.

In the present invention, it is assumed that, while a one-to-one correspondence may not exist, some interrelation exists between the number X of portable telephone terminals and the number Y of people, or between the number X of portable telephone terminals and the number Z of automobiles contained in the various groups that have undergone grouping; the number Y of people or number Z of automobiles within a group is actually measured or obtained from publicly released population statistics resources; and function F or function G that satisfies $Y=F(X)$ or $Z=G(X)$ is established. Then, using this function F or function G, an estimated population number Y or estimated number of vehicles Z can be derived and displayed from the number X of portable telephone terminals.

Because $Y=F(X)$ and $Z=G(X)$ are subject to variation and are not uniform over region or time, a great volume of data are preferably obtained by subdividing the time or region to the greatest extent possible and by setting weighting function according to each region or time zone to improve precision.

In the present invention, implementing a logical operation such as an AND operation, OR operation, or NAND operation upon one group and another group that have undergone grouping by various conditions enables grouping based on conditions of even greater complexity and can increase options that enable the free creation of groups that a user might desire.

In the present invention, groups realized according to grouping by various conditions are multivariable functions of, for example, space, time, speed, number of portable telephone terminals, and the states of these portable telephone terminals. As a result, in order to find information of a group that the user wants, the variables of a multivariable function that are to be fixed and the variables that are to be changed must be defined. In the present invention, the selection of the object, location, and time by the user enables the automatic setting of whether the area is to be fixed, whether the number of portable telephone terminals of the initial setting is to be fixed, or whether the speed is to be fixed.

Although the invention of the present application has been described hereinabove with reference to exemplary embodiments, the invention of the present application is not limited to the above-described exemplary embodiments. The configuration and details of the invention of the present application are open to various modifications within the scope of the invention of the present application that will be readily understood by one of ordinary skill in the art.

What is claimed is:

1. A portable telephone information visualizing device comprising:
    means that performs grouping of information of each of portable telephone terminals belonging to a common carrier based on at least one item of information from among space, time, speed, information associated with individual identification numbers of said portable telephone terminals, and status information indicating a state of said portable telephone terminals; and
    means that creates display data for visualizing a number of constituents of a group that has undergone said grouping, movement of the group, and in-group correlation or inter-group correlation between the group and another group, wherein:
    said means that performs grouping, when performing grouping based on said space information, collates information of the latitude and longitude of a closed figure that is designated on an electronic map with at least position information of said portable telephone terminals realized by a GPS (Global Positioning System) and performs grouping of portable telephone terminals that are present in said closed figure; and
    the number of said portable telephone terminals of the group that has been subjected to said grouping is returned to the source of the request that designated said closed figure to be displayed inside said closed figure designated on said electronic map or in the vicinity of said closed figure.

2. The portable telephone information visualizing device as set forth in claim 1, wherein:
    said means that performs grouping, when performing grouping based on information that is associated with said individual identification numbers, performs grouping of said portable telephone terminals that are present in said closed figure based upon one or more from among surname, age, or gender that is/are associated with the individual identification numbers of the portable telephone terminals;
    the number of said portable telephone terminals of groups that have undergone said grouping is returned to said source of the request to be displayed in said closed figure that is designated on said electronic map or in the vicinity of the closed figure.

3. The portable telephone information visualizing device as set forth in claim 1, wherein:
    said means that performs grouping, when performing grouping based on status information of said portable telephone terminals, performs grouping of said portable telephone terminals that are present in said closed figure according to the status of the portable telephone terminals; and
    the number of said portable telephone terminals of the groups that have undergone said grouping is returned to said source of the request to be displayed in said closed figure that is designated on said electronic map or in the vicinity of the closed figure.

4. The portable telephone information visualizing device as set forth in claim 1, wherein not only is said closed figure displayed in a predetermined color, but said groups that flow from said closed figure are also displayed in the same color as the closed figure.

5. The portable telephone information visualizing device as set forth in claim 1, wherein said portable telephone information visualizing device: sets a second closed figure that contains said closed figure and that is larger than the closed figure; selects, from among the vectors of said portable telephone terminals that are present in the second closed figure, vectors directed toward said closed figure; and displays the number of said portable telephone terminals of the selected vectors.

6. A portable telephone information visualizing device comprising:
    means that performs grouping of information of each of portable telephone terminals belonging to a common carrier based on at least one item of information from among space, time, speed, information associated with an individual identification numbers of said portable telephone terminals, and status information indicating a state of said portable telephone terminals; and
    means that creates display data for visualizing a number of constituents of a group that has undergone said grouping, movement of the group, and in-group correlation or inter-group correlation between the group and another group, wherein:
    said means that performs grouping performs grouping of said portable telephone terminals that have passed through a gate that is designated on an electronic map; and
    the number of said portable telephone terminals that have passed through said gate within a predetermined time interval is returned to the source of the request that designated said gate to be displayed in the vicinity of said gate exit.

7. The portable telephone information visualizing device as set forth in claim 6, wherein a unidirectional gate whose entrance and exit are clearly defined, a bidirectional gate whose entrance and exit are not distinguished, and a total-circumference gate where counting occurs regardless of the direction of passage, can be designated as said gate.

8. The portable telephone information visualizing device as set forth in claim 6, wherein a gate, at which only the number of portable telephone terminals that enter the gate are counted, can be designated as said gate.

9. A portable telephone information visualizing device comprising:
    means that performs grouping of information of each of portable telephone terminals belonging to a common carrier based on at least one item of information from among space, time, speed, information associated with an individual identification numbers of said portable telephone terminals, and status information indicating a state of said portable telephone terminals; and means that creates display data for visualizing a number of constituents of a group that has undergone said grouping, movement of the group, and in-group correlation or inter-group correlation between the group and another group, wherein said means that performs grouping, when performing grouping based on said speed information, performs grouping of portable telephone terminals for which the direction and size of speed vectors produced at the time of movement of said portable telephone terminals are the same; and when the number of the portable telephone terminals of a the group that has undergone grouping exceeds a value that is set in advance, causes the group that has undergone to become a new speed vector group, and then displays the speed vector group by any shape, displays the direction of movement of the speed vector group by an arrow, and displays the speed of the speed vector group by a number.

10. The portable telephone information visualizing device as set forth in claim 9, wherein, when said speed vector group gradually separates and the number of portable telephone terminals that make up the speed vector group falls below a value that is set in advance, the figure of the speed vector group is caused to disappear.

11. The portable telephone information visualizing device as set forth in claim 9, wherein said means that performs grouping: draws a line indicating a predetermined distance that is orthogonal to the track of said speed vector group, performs grouping of portable telephone terminals that are at a shorter distance from said track than said predetermined distance, and displays the number of portable telephone terminals that have undergone grouping in association with the figure of the speed vector group.

12. A portable telephone information visualizing device comprising:

means that performs grouping of information of each of portable telephone terminals belonging to a common carrier based on at least one item of information from among space, time, speed, information associated with an individual identification numbers of said portable telephone terminals, and status information indicating a state of said portable telephone terminals; and means that creates display data for visualizing a number of constituents of a group that has undergone said grouping, movement of the group, and in-group correlation or inter-group correlation between the group and another group, wherein a function of the interrelation between the number of portable telephone terminals and the number of people of the group that has undergone grouping in said means that performs grouping or a function of the interrelation between the number of said portable telephone terminals and the number of automobiles is established, and the function is used to derive and display an estimated population or an estimated number of vehicles.

* * * * *